United States Patent

Forys et al.

[11] Patent Number: 4,833,351
[45] Date of Patent: May 23, 1989

[54] MULIPLE AXIS ACTUATOR

[75] Inventors: Edward L. Forys, Covina; James D. Gehris, Rancho Palos Verdes, both of Calif.

[73] Assignee: McDonnell Douglas Corporation, Long Beach, Calif.

[21] Appl. No.: 177,064

[22] Filed: Apr. 4, 1988

[51] Int. Cl.[4] .............................................. H02K 41/00
[52] U.S. Cl. ...................................... 310/12; 318/135
[58] Field of Search ............................. 310/12, 13, 15; 318/135; 335/185

[56] References Cited

U.S. PATENT DOCUMENTS

| 3,433,983 | 3/1969 | Keistman et al. | 310/15 |
| 4,062,421 | 12/1977 | Weber | 318/135 X |
| 4,245,917 | 1/1981 | Mosciatti et al. | 310/13 X |
| 4,318,038 | 3/1982 | Munehiro | 318/135 |
| 4,421,997 | 12/1983 | Forys | 310/12 |
| 4,678,951 | 7/1987 | Nikaido | 310/13 |

Primary Examiner—William M. Shoop, Jr.
Assistant Examiner—Marc S. Hoff
Attorney, Agent, or Firm—Curtis L. Harrington; George W. Finch; John P. Scholl

[57] ABSTRACT

An improved two axis electromagnetically operated actuator is disclosed.

11 Claims, 2 Drawing Sheets

MULIPLE AXIS ACTUATOR

BACKGROUND OF THE INVENTION

The field of this invention relates generally to linear motor and rotational motor structures; more specifically, this invention relates to linear actuators utilized in the isolation of platforms in inertial stabilization systems. Systems commonly utilized for stablization include devices directed primarily to rotational motor systems as well as single axis actuator systems which utilize very narrow gap magnetic elements. This results in a cumbersome structure which requires an individual motor for each axis of rotation, or it requires a plurality of individual linear actuators, one for each translational axis of motion desired, or multiples thereof if rotational motion is desired.

A significant improvement over the above systems is disclosed in U.S. Pat. No. 4,443,743, entitled "Two Axis Actuator", and issued to Edward L. Forys, et al., and assigned to the assignee of the instant application. This device provides force along two translational axes through the interaction of multiple windings on a single platen which interacts with the field poles of a magnetic member. Each platen is meticulously wound such that the current flowing in one direction is maximally exposed to the magnetic field lines of the magnetic member, but the return path current is bunched in a small area of greater depth for minimal exposure to the magnetic field. The windings on each platen are geometrically complex and are therefore expensive to fabricate.

The asymetric geometry of the coils and their relative movements within the magnetic field as the actuator is operated cause the force produced to become more of a function of the angle of rotation than if the coils were of a simple geometric shape. Special winding procedures are required, along with special potting tools. A high rejection rate results from the complex geometry of the coils. Since the return current in the '743 invention was in the magnetic field, an undesirable counter electromotive force was present, thus causing a significant inefficiency. The weight of the platen coils is also important. For the same electromotive force, the peculiar geometry of the platen coils dictated more windings and therefore a greater weight.

The shape of currently used systems limit the application of such systems to custom gimbals and stabilizers. For space applications, efficiency is of paramount importance. Less efficiency implies more electrical current to do the same job, and therefore less current available elsewhere, or a greater payload required to lift more fuel or solar cells.

SUMMARY OF THE INVENTION

The present invention utilizes a wide gap stationary magnetic field created by either a permanent magnet or an electromagnet. A second magnetic field is generated by an electromagnet whose magnetic field is reversible. An armature is provided to support the sources of magnetic field and to facilitate or limit movement in one or more axes as desired.

The current in the electromagnetic windings may be reversibly varied to provide the degree of control necessary for a specific control application.

The forces resulting from the current flow are used to create force perpendicular to the direction of current flow and perpendicular to the lines of magnetic flux according to the well known formula:

$$F = n(I \times B)$$

Where:
I = Current flowing in each conductor
B = Magnetic flux density
X = Vector cross product
n = number of conductors
F = Force generated.

The support and sequence of energization of the coils will determine the type of actuation resulting. The present invention is especially well suited for operation under computer control, especially for use as a stabilizer for a sight or other optical device.

DETAILED DESCRIPTION OF THE PREFERRED EMBODIMENTS

Figure 1:
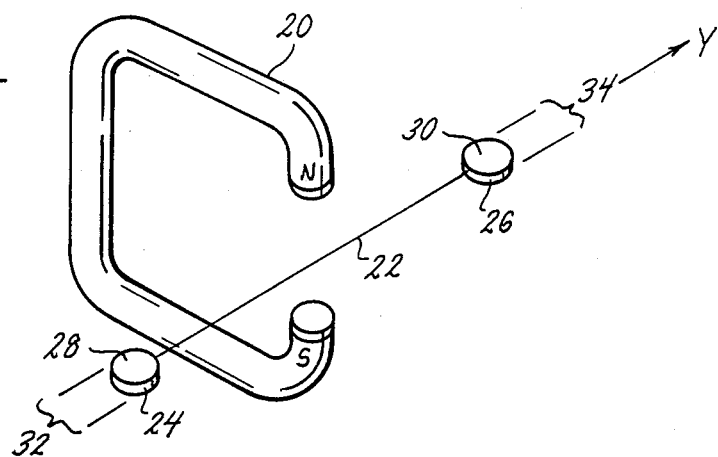
FIG. 1 is a perspective view illustrating a two coil configuration for production of force in one axis.

Referring to FIG. 1, a C shaped permanent magnet 20 having a north pole, N and a south pole S, provides a stationary linear magnetic field between its poles. An armature 22 moveable in the Y axis is provided between the poles N and S of magnet 20. Fixably attached to the ends of armature 22 is a coil 24 and a coil 26. Coil 24 has an upper surface 28 and coil 26 has an upper surface 30. Coils 24 and 26 also have lower surfaces, parallel to their upper surfaces 28 and 30, respectively, which are not shown in FIG. 1. A pair of electrical leads 32 extend from coil 24 and a pair of electrical leads 34 extend from coil 26.

Armature 22 supports coils 24 and 26, and is supported by means not shown to allow movement of armature 22, and coils 24 and 26 in the Y direction. The Y direction is illustrated in the upper right hand corner of FIG. 1. Coils 24 and 26 are wound to produce the maximum magnetic flux from and perpendicular to their upper surfaces 28 and 30, respectively, and their lower surfaces. It is understood that magnet 20 is for the purpose of providing a linear magnetic field between poles N and S as shown in FIG. 1. Magnet 20 could be replaced by two linear magnets, one having a downwardly directed north pole and the other having an upwardly directed south pole. It is also understood that magnet 20 could be replaced by two electromagnets, one having a downwardly directed north pole and the other having an upwardly directed south pole.

Operation of the device of FIG. 1 is performed by energizing the leads 32 and 34 of coils 24 and 26 respectively. When the current is applied to both coils simultaneously to cause the upper surface 30 of coil 26 to become magnetically north, and to cause the upper surface 28 of coil 24 to become magnetically south, coil 24 will be drawn into the magnetic field between the poles N and S of magnet 20, and coil 26 will be expelled. This will drive armature 22 from left to right on FIG. 1, in the positive Y direction. When the current is applied to both coils simultaneously to cause the upper surface 30 of coil 26 to become magnetically south, and to cause the upper surface 28 of coil 24 to become magnetically north, coil 26 will be drawn into the magnetic field between the poles N and S of magnet 20, and coil 24 will be expelled. This will drive armature 22 to from right to left on FIG. 1, in the negative Y direction.

Figure 2:
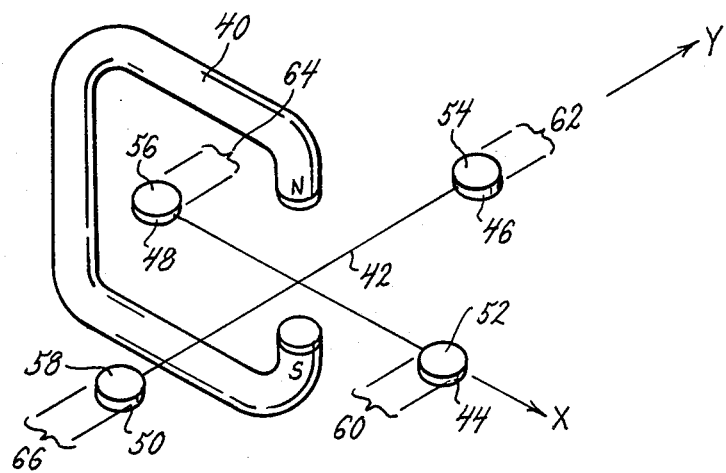
FIG. 2 is a perspective view illustrating a four coil configuration for production of force in two axes.

Referring to FIG. 2, a C shaped permanent magnet 40 having a north pole, N and a south pole S, provides a stationary linear magnetic field between its poles. A cross-shaped armature 42, moveable in both the X and the Y axis is provided between the poles N and S of magnet 40. Fixably attached to each of the four ends of armature 22 are coils 44, 46, 48, and 50. Coil 44 has an upper surface 52, coil 46 has an upper surface 54, coil 48 has an upper surface 56, and coil 50 has an upper surface 58. Coils 44, 46, 48, and 50 also have lower surfaces, parallel to their upper surfaces 52, 54, 56, and 58, respectively, which are not shown in FIG. 2. A pair of electrical leads 60 extend from coil 44, a pair of electrical leads 62 extend from coil 46, a pair of electrical leads 64 extend from coil 48, and a pair of electrical leads 66 extend from coil 50.

Armature 42 supports coils 44, 46, 48, and 50, and is supported by means not shown to allow movement of armature 22 in either the X or the Y direction. The Y direction is illustrated in the upper right hand corner and the X direction is illustrated in the lower right hand corner of FIG. 2. Coils 44, 46, 48, and 50 are wound to produce the maximum magnetic flux from the perpendicular to their upper surfaces 52, 54, 56, and 58, respectively, and their lower surfaces. It is understood that magnet 40 is for the purpose of providing a linear magnetic field between poles N and S as shown in FIG. 2. Magnet 40 could be replaced by two linear magnets, one having a downwardly directed north pole and the other having an upwardly directed south pole. It is also understood that magnet 40 could be replaced by two electromagnets, one having a downwardly directed north pole and the other having an upwardly directed south pole.

Operation of the device of FIG. 2 along the X axis is performed by energizing the leads 60 and 64 of coils 44 and 48 respectively. When the current is applied to both coils simultaneously to cause the upper surface 52 of coil 44 to become magnetically north, and to cause the upper surface 56 of coil 48 to become magnetically south, coil 48 will be drawn into the magnetic field between the poles N and S of magnet 40, and coil 44 will be expelled. This will drive armature 42 from the upper left to the lower right on FIG. 2, in the positive X direction. When the current is applied to both coils simultaneously to cause the upper surface 52 of coil 44 to become magnetically south, and to cause the upper surface 56 of coil 48 to become magnetically north, coil 44 will be drawn into the magnetic field between the poles N and S of magnet 40, and coil 48 will be expelled. This will drive armature 42 from the lower right to the upper left on FIG. 2, in the negative X direction.

Figure 3:
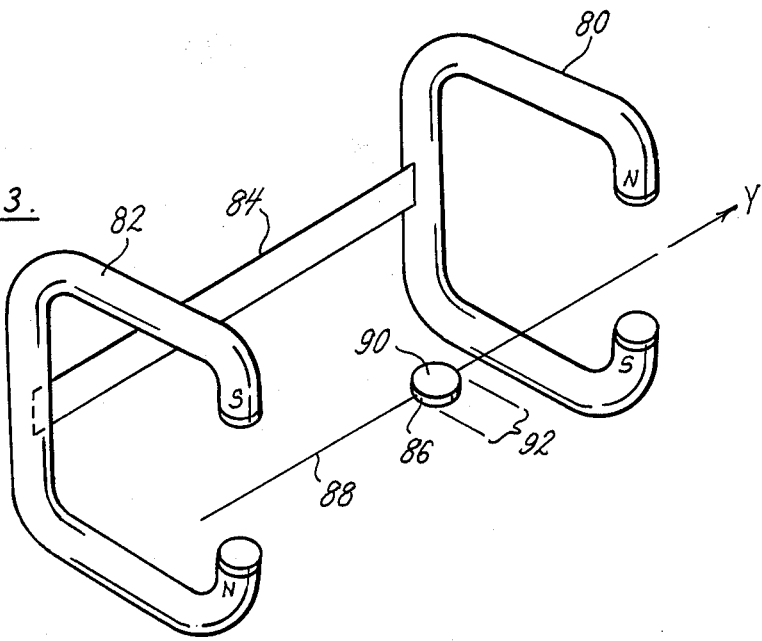
FIG. 3 is a perspective view illustrating a single coil configuration with two magnetic fields for production of force in one axis.

Referring to FIG. 3, a pair of C shaped permanent magnets, 80 and 82 each having having a north pole, N and a south pole S, provide a pair of stationary linear magnetic fields between their poles. The north pole of magnet 80 is oriented downward and opposite of magnet 82 whose north pole is oriented upward. Magnet 80 is fixedly attached to magnet 82 by means of a support member 84. A coil 86 is slidably supported by an armature 88. Coil 86 has an upper surface 90, and a lower surface parallel to upper surface 90, not shown in FIG. 3. A pair of electrical leads 92 extend from coil 86.

Armature 88 supports coil 86, and is itself supported by means not shown, to allow movement of armature 88 in the Y direction. The Y direction is illustrated in the upper right hand corner of FIG. 3. Coil 86 is wound to produce the maximum magnetic flux from and perpendicular to its upper surface 90 and its lower surface. It is understood that magnets 80 and 82 are for the purpose of providing a pair of spaced apart, parallel linear magnetic fields between their oppositely oriented N and S poles as shown in FIG. 3. Magnets 80 and 82 could each be replaced by two linear magnets, linearly spaced apart, one pair having a downwardly directed north pole and having an upwardly directed south pole, and the other pair having a downwardly directed south pole and having an upwardly directed south pole. It is also understood that magnets 80 and 82 could each be replaced by two linear and spaced apart electromagnets, one set having a downwardly directed north pole and an upwardly directed south pole, the other set having a downwardly directed south pole and an upwardly directed north pole.

Operation of the device of FIG. 3 along the Y axis is performed by energizing the leads 90 of coil 86. When current is applied to cause the upper surface 90 of coil 86 to become magnetically north, coil 86 is drawn into the magnetic field of magnet 82 and expelled from the magnetic field of magnet 80. This action will drive armature 88 from the upper right to the lower left on FIG. 3, in the negative Y direction. When current is applied to cause the upper surface 90 of coil 86 to become magnetically south, coil 86 is drawn into the magnetic field of magnet 80 and expelled from the magnetic field of magnet 82. This action will drive armature 88 from the lower left to the upper right on FIG. 3, in the positive Y direction.

Figure 4:
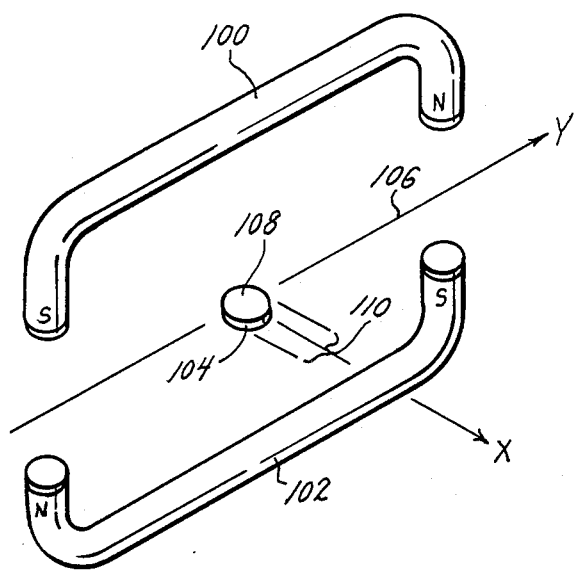
FIG. 4 is a perspective view illustrating an alternative single coil configuration with two magnetic fields for production of force in one axis; and, FIG. 5 is a perspective view illustrating a three coil configuration with two magnetic fields for production of force in two axes.

Referring to FIG. 4, an alternative arrangement illustrating the single axis principles of FIG. 3 are shown. A pair of C shaped permanent magnets, 100 and 102 each having having a north pole, N and a south pole S, provide a pair of stationary linear magnetic fields, each between the poles at each end of magnet 100 and 102. The north pole of magnet 100 is oriented downward and opposite of the upwardly oriented south pole of magnet 102. The south pole of magnet 100 is oriented downward and opposite of the upwardly oriented north pole of magnet 102. Magnets 100 and 102 are positionally fixed in a manner not shown. A coil 104 is slidably supported by an armature 106. Coil 104 has an upper surface 108, and a lower surface parallel to upper surface 108, not shown in FIG. 4. A pair of electrical leads 110 extend from coil 104.

Armature 106 supports coil 104, and is itself slidably supported by means not shown, to allow movement of armature 106 in the Y direction. The Y direction is illustrated in the upper right hand corner of FIG. 4. Coil 104 is wound to produce the maximum magnetic flux from and perpendicular to its upper surface 108 and its lower surface. It is understood that magnets 100 and 102 are for the purpose of providing a pair of spaced apart, parallel linear magnetic fields between the oppositely oriented N and S poles of each of magnets 100 and 102 as shown in FIG. 4. Magnets 100 and 102 could each be replaced by two linear magnets, linearly spaced apart, one pair having a downwardly directed north pole and having an upwardly directed south pole, and the other pair having a downwardly directed south pole and having an upwardly directed north pole. It is also understood that magnets 100 and 102 could each be replaced by two linear and spaced apart electromagnets, one set having a downwardly directed north pole and an upwardly directed south pole and the other set having a downwardly directed south pole and an upwardly directed north pole.

Operation of the device of FIG. 4 along the Y axis is performed by energizing the leads 110 of coil 104. When current is applied to cause the upper surface 108 of coil 104 to become magnetically north, coil 104 is drawn into the magnetic field between the south pole of magnet 100 and the north pole of magnet 102, and expelled from the magnetic field between the north pole of magnet 100 and the south pole of magnet 102. This action will drive armature 106 from the upper right to the lower left on FIG. 4 in the negative Y direction. When current is applied to cause the upper surface 108 of coil 104 to become magnetically south, coil 104 is drawn into the magnetic field between the north pole of magnet 100 and the south pole of magnet 102, and expelled from the magnetic field between the south pole of magnet 100 and the north pole of magnet 102. This action will drive armature 106 from the lower left to the upper right on FIG. 4, in the positive Y direction.

Figure 5:
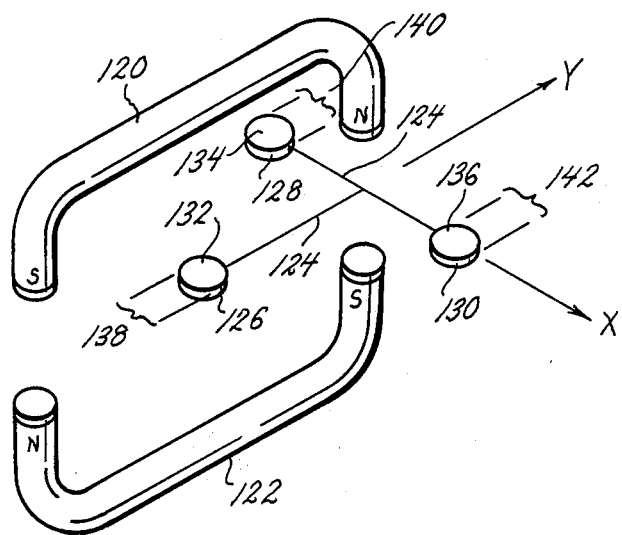

Referring to FIG. 5, an arrangement illustrating a two axis operation is shown. A pair of C shaped permanent magnets, 120 and 122 each having having a north pole, N and a south pole S, provide a pair of stationary linear magnetic fields, each between the poles at each end of magnet 120 and 122. The north pole of magnet 120 is oriented downward and opposite of the upwardly oriented south pole of magnet 122. The south pole of magnet 120 is oriented downward and opposite of the upwardly oriented north pole of magnet 122. Magnets 120 and 122 are positionally fixed in a manner not shown. A T shaped armature 124 supports a coil 126, coil 128 and a coil 130 between magnets 120 and 122. Coil 126 is positioned between the linear magnetic fields created by magnets 120 and 122, while coils 128 and 130 are positioned on either side of one of the magnetic fields created by magnets 120 and 122. Coils 126, 128, and 130 have upper surfaces 132, 134, and 136, respectively. Coils 126, 128, and 130 also have lower surfaces parallel to upper surfaces 132, 134, and 136, which are shown in FIG. 5. A pair of electrical leads 138, 140 and 142 extend from coils 126, 128, and 130, respectively.

Armature 124 supports coils 126, 128 and 130, and is itself slidably supported by means not shown, to allow movement of armature 124 in both the X and the Y directions. The Y direction is illustrated in the upper right hand corner and the X direction is illustrated in the lower right hand corner of FIG. 5. Coils 126, 128, and 130 are wound to produce the maximum magnetic flux from and perpendicular to upper surfaces 132, 134, and 136, respectively, and their lower surfaces. It is understood that magnets 120 and 122 are for the purpose of providing a pair of spaced apart, parallel linear magnetic fields between the oppositely oriented N and S poles of each of magnets 120 and 122 as shown in FIG. 5. Magnets 120 and 122 could each be replaced by two linear magnets, linearly spaced apart, one pair having a downwardly directed north pole and having an upwardly directed south pole, and the other pair having a downwardly directed south pole and having an upwardly directed south pole. It is also understood that magnets 120 and 122 could each be replaced by two linear and spaced apart electromagnets, one set having a downwardly directed north pole and an upwardly directed south pole, the other set having a downwardly directed south pole and an upwardly directed north pole.

Operation of the device of FIG. 5 along the Y axis is performed by energizing the leads 138 of coil 126. When current is applied to cause the upper surface 132 of coil 126 to become magnetically north, coil 126 is drawn into the magnetic field between the south pole of magnet 120 and the north pole of magnet 122, and expelled from the magnetic field between the north pole of magnet 120 and the south pole of magnet 122. This action will drive armature 124 from the upper right to the lower left on FIG. 5, in the negative Y direction. When current is applied to cause the upper surface 132 of coil 126 to become magnetically south, coil 126 is drawn into the magnetic field between the north pole of magnet 120 and the south pole of magnet 122, and expelled from the magnetic field between the south pole of magnet 120 and the north pole of magnet 122. This action will drive armature 124 from the lower left to the upper right on FIG. 5, in the positive Y direction.

Operation of the device of FIG. 5 along the X axis is performed by energizing the leads 140 and 142 of coils 128 and 130 respectively. When the current is applied to both of the coils 128 and 130 simultaneously to cause the upper surface 134 of coil 128 to become magnetically north, and to cause the upper surface 136 of coil 130 to become magnetically south, coil 130 will be drawn into the magnetic field between the north pole of magnet 120 and the south pole of magnet 122, and coil 128 will be expelled from the magnetic field between the north pole of magnet 120 and the south pole of magnet 122. This will drive armature 124 from the lower right to the upper left on FIG. 5, in the negative X direction.

When the current is applied to both of the coils 128 and 130 simultaneously to cause the upper surface 134 of coil 28 to become magnetically south, and to cause the upper surface 136 of coil 130 to become magnetically north, coil 128 will be drawn into the magnetic field between the north pole of magnet 120 and the south pole of magnet 122, and coil 130 will be expelled from the magnetic field between the north pole of magnet 120 and the south pole of magnet 122. This will drive armature 124 from the upper left to the lower right on FIG. 5, in the positive X direction. Simultaneous application of current to coil 126 and to coils 128 and 130 will cause movement in the X and the Y directions simultaneously.

The foregoing disclosure and description of the invention are illustrative and explanatory thereof, and various changes in the strength, magnetic properties and shape of the materials, as well as in the details of the illustrated construction may be made without departing from the spirit and scope of the invention.

We claim:

1. An actuator capable of generating force comprising:
 a C shaped magnet having a south pole and a north pole, said south pole opposing said north pole to create an essentially linear magnetic field between said north and said south pole;
 an armature, associated with said magnetic field, and having two ends, supported to slidably move longitudinally in a direction orthogonal to said magnetic field and through said magnetic field; and, two current carrying coils, one attached to each end of said armature, each said current carrying coil wound in one direction about an axis colinear with the axis of said magnetic field, each said coil supported by said armature and slidably drawable into coaxial alignment with said magnetic field upon introduction of a current in said coil, each said coil having a first and a second terminal.

2. The multiaxis actuator of claim 1 wherein said means for generating a magnetic field further comprises a pair of opposite polarity electromagnetic coils.

3. The multiaxis actuator of claim 2 wherein said opposite polarity electromagnetic coils have a generally circular cross section.

4. The multiaxis actuator of claim 2 wherein said opposite polarity electromagnetic coils have a generally rectangular cross section.

5. The actuator of claim 1 wherein a second terminal of one of said two current carrying coils is connected to a first terminal of the other of said two current carrying coils, such that current flow into a first terminal of one of said two current carrying coils and out of said second terminal of the other of said two current carrying coils produces magnetic fields of opposite orientation in said two current carrying coils.

6. An actuator capable of generating force, comprising:
   a first electromagnet having a south pole;
   a second electromagnet having a north pole, said south pole of said first electromagnet opposing said north pole of said second electromagnet to create an essentially linear magnetic field between said first and said second electromagnet.
   an armature, associated with said magnetic field, and having two ends, supported to slidably move longitudinally in a direction orthogonal to said magnetic field and through said magnetic field; and,
   two current carrying coils, one attached to each end of said armature, each said current carrying coil wound about an axis colinear with the axis of said magnetic field, each said coil supported by said armature and slidably moveable into coaxial alignment with said magnetic field, each said coil having a first and a second terminal.

7. An actuator capable of generating force, comprising:
   a C shaped magnet having a south pole and a north pole, said south opposing said north pole to create an essentially linear magnetic field between said north and said south pole;
   a cross shaped armature, associated with said magnetic field, and having four ends, and supported to slidably move longitudinally in all directions orthogonal to said magnetic field and through said magnetic field; and,
   four current carrying coils, one attached to each end of said armature, each said current carrying coil wound about an axis colinear with the axis of said magnetic field, each said coil supported by said armature and slidably moveable into coaxial alignment with said magnetic field, each said coil having a first and a second terminal.

8. The actuator of claim 7 wherein said four current carrying coils comprise a first coil located opposite a third coil, and a second coil opposite a fourth coil, and wherein said second terminal of said first current carrying coils is connected to a first terminal of said third current carrying coil, and said second terminal of said second current carrying coils is connected to a first terminal of said fourth current carrying coil, such that current flow into a first terminal of said first current carrying coil and out of said second terminal of said third current carrying coil produces magnetic fields in said first and said third current carrying coils of opposite orientation with respect to each other, and such that current flow into a first terminal of said second current carrying coil and out of said second terminal of said fourth current carrying coil produces magnetic fields in said second and said fourth current carrying coils of opposite orientation with respect to each other.

9. A multidirectional actuator comprising:
   an upper, downward oriented U shaped magnet having a south pole end and a north pole end;
   a lower, upward oriented U shaped magnet having a south pole end and a north pole end, said south pole end of said upper magnet opposite said north pole end of said lower magnet to create a first linearly oriented magnetic field, and said north pole end of said upper magnet opposite said south pole end of said lower magnet to create a second linearly oriented magnetic field;
   a T shaped support member, having arms and a base, translationally slidably supported between said north pole end of said upper magnet and said south pole end of said lower magnet;
   a first coil, having a first terminal and a second terminal, and connected to one of said arms of said T shaped support member;
   a second coil, having a first terminal and a second terminal, and connected to the other of said arms of said T shaped support member; and,
   a third coil, having a first terminal and a second terminal, and connected to the base of said T shaped support member, said third coil quiescently located generally between said first and said second magnetic fields.

10. The actuator of claim 9 wherein a second terminal of said first coil is connected to a first terminal of said second current carrying coil, such that current flow into a first terminal of said first current carrying coil and out of said second terminal of said second current carrying coil produces magnetic fields of opposite orientation in said first and said second current carrying coils.

11. The multidirectional actuator of claim 9 wherein said upper, downward oriented U shaped magnet, and said lower, upward oriented U shaped magnet are electromagnets.

* * * * *